United States Patent Office 3,843,404

Patented Oct. 22, 1974

3,843,404

MAGNETIC RECORDING COATING

Joseph E. Haefele, San Jose, Cecil R. Hawkins, Los Gatos, and Ronald E. Kubec, San Jose, Calif., assignors to International Business Machines Corporation, Armonk, N.Y.

No Drawing. Continuation of abandoned application Ser. No. 44,284, June 8, 1970. This application Sept. 18, 1972, Ser. No. 289,892

Int. Cl. H01f *10/02*

U.S. Cl. 117—235 4 Claims

ABSTRACT OF THE DISCLOSURE

A magnetic recording medium, such as a magnetic recording disk, having a magnetic recording layer that contains ferromagnetic and nonferromagnetic particles dispersed in a binder. The nonferromagnetic particles are disposed in the binder to be substantially equal to the thickness of the coated layer, and are of a material having a greater hardness than that of the binder.

This application is a continuation of application Ser. No. 44,284, "Magnetic Recording Coating," filed June 8, 1970 and now abandoned by the same inventors of and assigned to the same assignee as this application.

FIELD OF THE INVENTION

Magnetic coating compositions comprising ferromagnetic particles dispersed in a binder having additives thereto for the purpose of improving wear characteristics.

BACKGROUND OF THE INVENTION

Magnetic recording media are well known in the art, and include tapes, disks, drums, and other forms of tablet or continuous loop configurations. These recording media generally comprise a magnetic coating material deposited upon a permanent substrate. The magnetic coating material in turn consists of ferromagnetic particles such as iron oxide disposed in a binder, such as an epoxy resin. Often, the binder systems are complex, and the ferromagnetic materials may include other ferromagnetic materials in addition to iron oxide.

These coating compositions are disposed upon the permanent substrate by a number of means, such as by dipping or spin coating or spraying, and are cured or otherwise hardened to form a permanent part of the structure.

These various magnetic recording media are of course utilized in conjunction with magnetic recording heads or transducers to produce the desired reading, read/write, or write properties. As technology improves, thinner and thinner coatings capable of higher density recording are being developed by the industry. This in turn requires that the recording heads be brought closer and closer to physical contact with the recording media. Very often, as in the case of magnetic disks, this results in "crashing" of the head into the surface of the disk. This causes wear upon the disk and head faces. The debris caused by such a crash often adheres to the head and affects its aerodynamic properties; and if the coating is physically displaced at point of contact, the information stored there will be permanently or partially destroyed.

Thus, it is an object of this invention to provide a magnetic recording layer of high abrasion resistance.

Another object of this invention is to provide a magnetic recording layer having abrasion resistance and low electrical noise.

Still another object of this invention is to provide a magnetic recording layer that in conjunction with a particular magnetic recording head will act as a self-cleaning mechanism for the magnetic recording head.

SUMMARY OF THE INVENTION

These and other objects are met by the magnetic recording medium of this invention. Briefly stated, this invention comprises a magnetic recording medium such as a magnetic disk having a magnetic recording layer thereon. The magnetic recording layer comprises ferromagnetic and nonferromagnetic particles dispersed in a binder. The ferromagnetic particles may be iron oxide, the nonferromagnetic particles alumina, and the binder a conventional binder, such as an epoxy binder. The nonferromagnetic particles are chosen to have at least one dimension substantially equal in thickness to the final desired thickness of the magnetic coating layer. Further, the nonferromagnetic particles are chosen to have a greater hardness than that of the binder material.

By so selecting the nonferromagnetic particles, upon forming the magnetic recording layer the nonferromagnetic particles serve as a noncompressible support material to prevent the head in a crash situation from digging into the recording layer. An acceptable amount of nonferromagnetic particles disposed in the coating is 3% by weight calculated as percent of total ferromagnetic and nonferromagnetic particles.

This invention will best be understood with reference to the accompanying drawing and general specification.

In the drawing:

The single figure represents a schematic cross section of the magnetic recording layer on a permanent substrate to form the magnetic recording medium of this invention.

GENERAL DESCRIPTION

The use of a hard particulate material such as aluminum oxide in controlled quantities and sizes is used to substantially increase the abrasion resistance and durability of a magnetic disk coating. Magnetic coatings, for tape or for disks, generally comprise a ferromagnetic material such as an acicular gamma iron oxide dispersed in an organic binder, such as an epoxy binder. The binder material may be a series of various organic materials, and the magnetic material may also include chromium dioxide or other magnetic recording materials. These materials are often mixed in a ball mill, and applied by well-known means such as spin or spray coating to the permanent substrate, a disk or tape material, for example.

It is well-known in the art that various additions can be made to the magnetic recording layer as a function of the desired properties. Thus, various organic materials or graphite have been added as lubricating materials to the recording layer. Further, ball mill debris from the ceramic ball mills has long been a common material present in most magnetic recording materials of the past 30 years. The effect of the ball mill debris has been to improve abrasion resistance of the magnetic recording layer. The effect of the addition of ceramic debris, and deliberately added ceramic materials in general, has also been to increase the noise level in such magnetic recording layers.

It is also well-known in the art that as the amount of ceramic material, primarily alumina, is reduced within the magnetic recording medium, noise decreases but abrasion resistance also decreases. A common compromise is to accept the maximum allowable abrasion at the lowest amount of ceramic addition resulting in the lowest amount of noise. This still results in appreciable quantities of ceramic debris and deliberately added ceramic materials being present in the coating composition.

We have found the unusual and unexpected result that if a nonferromagnetic material is added to the magnetic coating layer with two important parameters present, a much reduced quantity of the material may be utilized resulting in both high abrasion resistance and low noise characteristics. These parameters are that the material have a hardness greater than that of the binder material, and that at least one dimension of the nonferromagnetic particle additive be substantially equal to the thickness of the final desired coating. Thus, for example, where alumina is the desired additive because of its high hardness, at least one dimension of the particle should be equal to the coating thickness. This may be illustrated with reference to FIG. 1. Shown are three different shaped alumina particles in a coating of a given thickness. Shown is a permanent substrate 1, which may be a section of an aluminum disk for example. Coated upon substrate 1 is magnetic recording layer 2. This layer is a 3-part system comprising ferromagnetic paticles 3 disposed in a binder 4. Also within the binder are nonferromagnetic particles 5. These particles are not all the same size. In common, however, each of them has at least one dimension equal to the thickness of the coating. When these particles are disposed in the coating so that the dimension is substantially equal to the thickness of the layer, then these particles then form an essentially noncompressible support medium for the balance of the coating. Being harder than the binder, they tend to take the wear that occurs when the head contacts the magnetic recording layer. Further, as they form a solid barrier between the surface of the layer and the surface of the substrate, they cannot be pushed into the softer binder as is the case when particles of random size are utilized. Thus, they further tend to support the head and prevent gouging of the magnetic recording layer.

It is well-known that it is extremely difficult, if not impossible, to utilize particles all of the same size. A particle size distribution is always present especially when utilizing ceramic materials or particulate materials in general. However, every effort should be made to see that substantially most of the additive nonferromagnetic particles are substantially equal to the thickness of the desired coating. Thus, where a 50 to 70 microinch recording layer is desired, the particles should have a particle size distribution so as to have most particles having at least one dimension within this range.

Various materials may be utilized as the nonferromagnetic material. These include alumina in its various forms, boron carbide, silicon carbide, tungsten carbide, boron nitride, and the hard metals and alloys such as stainless steel, tungsten, and other materials known in the art.

Further, we have found that a preferred amount of such material is approximately 4% by weight of nonferromagnetic particles to ferromagnetic plus nonferromagnetic particles. A preferred range is between 3 to 5 percent. We have found that between 0–3%, there is no appreciable increase in durability of the coating. Above 5%, while there is some gain in durability over the 3–5% range, it is offset by a greater increase in noise. The transition level appears to be between 3 and 5% as an optimum or preferred amount. A typical coating composition might be, for example, 50% of a common organic resinous binder with 50% solids pigment, the pigment comprising iron oxide ferromagnetic particles having 4% of the total 50% as nonferromagnetic particles, such as alumina.

The nonferromagnetic particle additive if it is a ceramic may contain not only positively added ceramic material, but may also include ball mill debris where the particle size of the debris fits within the requirements as set forth above. This, of course, depends on the type of mill, the size of ball, capacity of the mill, solvent loading and materials utilized, and thickness of the coating. It is thus an empirical evaluation as a function of any given system utilized. Nonetheless, it is in another source of adding the nonferromagnetic particle to the coating composition.

Where a specific magnetic recording head is going to be utilized with a particular recording medium, it is also desirable that the nonferromagnetic particle have a hardness not only greater than that of the binder, but also harder than that of the contaminants that tend to accumulate upon the head. These contaminants are particles generated from wear of the disk coating, and airborne and surrounding environmental dust particles. Thus, for a common ferrite recording head, a hard particle such as alumina will serve to continually clean the head every time the head inadvertently makes contact with the disk. Thus, instead of various types of "garbage" building up upon the transducing head resulting in increased noise and problems, the abrasive nature of the additive to the coating will serve to continually clean the recording head.

The table below shows examples of various tests performed to show the relationship between the size of the particle, the thickness of the coating, and the amount of nonferromagnetic particle added to a magnetic recording coating to show the increased coating durability.

| Particle size | Coating thickness | Approximate $Al_2O_3$ percent based on total pigment | | | | | |
|---|---|---|---|---|---|---|---|
| | | 1.5 | 3 | 4 | 7 | 20 | 25 |
| 2μ $Al_2O_3$ | 50μ″~1.2μ | | | [1] 3.9 | 3.7 | | 3.4 |
| 2μ $Al_2O_3$ | 100μ″~2.5μ | | | 2.3 | 3.0 | | 2.3 |
| 1μ $Al_2O_3$ | 50μ″~1.2μ | | | 3.7 | 3.9 | | |
| ½μ $Al_2O_3$ | 100μ″~2.5μ | | | | 1.3 | | 1.3 |
| ¾μ ceramic ball mill debris. | 50μ″~1.2μ | 2.3 | 2.3 | | | 3.7 | |
| Do | 100μ″~2.5μ | 1.7 | 1.9 | | | 3.0 | |
| ¾μ $Al_2O_3$ | 50μ″~1.2μ | | | 2.8 | 2.7 | | 3.4 |
| ¾μ $Al_2O_3$ | 100μ″~2.5μ | | | 2.1 | 2.0 | | 1.9 |

[1] The numbers in the table represent wear characteristics of the coating in the form of the number of strokes per microinch wear, meaning the number of strokes of an abrasive paper passing a given area to cause one microinch of wear to occur at that area. The higher the number, the greater the wear resistance. This test is known as the PPA (polishing paper abrasion) test.

While the mechanisms involved are not completely understood, nonetheless it is clear that the particular properties desired—particle size and hardness—are controlling properties in the selection of the nonferromagnetic particle to be added to the magnetic recording medium. Further, while discussion has centered mainly upon magnetic recording disks, it is clear that other types of magnetic recording media are similarly affected, such as tapes and drums. Thus in sum, what has been disclosed is a magnetic recording medium comprising ferromagnetic and nonferromagnetic particles disposed in the binder. The preferred nonferromagnetic particle is alumina, and the preferred ferromagnetic particle is iron oxide. The nonferromagnetic particle is disposed in the binder to be substantially equal to the thickness of the magnetic medium. In this way, the improved abrasion resistance is achieved. Further, the nonferromagnetic particle should be a material having a greater hardness than that of the binder. Where cleaning characteristics are also desired, the nonferromagnetic particle should have a hardness greater than that of the contaminants on the recording head matched with the system. The preferred amount of nonferromagnetic particle is between 3 and 5%, preferably 4%.

Thus, what is claimed is:

1. A magnetic recording medium comprising ferromagnetic and alumina particles dispersed in a binder as a unitary coating upon a non-magnetic substrate, each of the alumina particles disposed in said binder to be substantially equal to the thickness of the medium to form a solid barrier between the surface of the medium and the underlying non-magnetic substrate and present in an amount not above 5% by weight of the ferromagnetic and alumina particles.

2. A magnetic recording medium comprising ferromagnetic and alumina particles dispersed in a binder as a unitary coating upon a non-magnetic substrate, each of the alumina particles disposed in said binder to be substantially equal to the thickness of the medium to form a solid barrier between the surface of the medium and the underlying non-magnetic substrate and present in an amount between 3 to 5% by weight of the ferromagnetic and alumina particles.

3. A magnetic recording medium comprising ferromagnetic and alumina particles dispersed in a binder as a unitary coating of substantially 50 microinches upon a non-magnetic substrate, each of the alumina particles disposed in said binder to be substantially equal to the thickness of the medium to form a solid barrier between the surface of the medium and the underlying non-magnetic substrate and present in an amount not above 5% by weight of the ferromagnetic and alumina particles.

4. A magnetic recording medium comprising ferromagnetic and alumina particles dispersed in a binder as a unitary coating of substantially 50 microinches upon a non-magnetic substrate, each of the alumina particles disposed in said binder to be substantially equal to the thickness of the medium to form a solid barrier between the surface of the medium and the underlying non-magnetic substrate and present in an amount between 3 to 5% by weight of the ferromagnetic and alumina particles.

References Cited

UNITED STATES PATENTS

| | | | |
|---|---|---|---|
| 3,630,910 | 12/1971 | Akashi et al. | 117—240 X |
| 3,622,386 | 11/1971 | Larson | 117—237 X |
| 2,594,893 | 4/1952 | Faus | 117—235 X |
| 2,857,879 | 10/1958 | Johnson | 117—235 X |
| 3,249,466 | 5/1966 | Luster | 117—235 |
| 3,069,815 | 12/1962 | Valentine | 117—235 X |
| 3,687,725 | 8/1972 | Hartmann et al. | 117—237 X |
| 3,630,910 | 12/1971 | Akashi et al. | 117—235 X |

MICHAEL SCFOCLEOUS, Primary Examiner

B. D. PIANALTO, Assistant Examiner

U.S. Cl. X.R.

117—240; 252—62.54